US011128368B1

(12) United States Patent
Alvarez (10) Patent No.: US 11,128,368 B1
(45) Date of Patent: Sep. 21, 2021

(54) IDENTIFYING LOCATIONS OF ITEMS IN AIRCRAFT

(71) Applicant: The Boeing Company, Chicago, IL (US)

(72) Inventor: Christopher P. Alvarez, Burien, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/867,894

(22) Filed: May 6, 2020

(51) Int. Cl.
*H04B 7/08* (2006.01)
*H04B 17/318* (2015.01)
*B64D 11/06* (2006.01)
*H04W 84/18* (2009.01)

(52) U.S. Cl.
CPC ............ *H04B 7/086* (2013.01); *B64D 11/06* (2013.01); *H04B 17/318* (2015.01); *H04W 84/18* (2013.01)

(58) Field of Classification Search
CPC ..... H04B 1/401; H04B 7/086; H04W 17/318; H04W 52/0229; H04W 52/0235; H04W 84/18; B64D 11/06; Y02D 70/22
See application file for complete search history.

(56) References Cited

U.S. PATENT DOCUMENTS

| 6,195,609 | B1* | 2/2001 | Pilley | ................. | G08G 5/0013 |
| | | | | | 701/120 |
| 9,380,428 | B1 | 6/2016 | Dame et al. | | |
| 2006/0143661 | A1 | 6/2006 | Funderburk et al. | | |
| 2018/0201285 | A1* | 7/2018 | Brooks | ................... | B61C 17/00 |
| 2019/0318164 | A1 | 10/2019 | Kumar et al. | | |
| 2020/0208989 | A1* | 7/2020 | Ottnad | .................. | H04W 4/029 |
| 2020/0358471 | A9* | 11/2020 | Sharma | ............. | H04W 52/0235 |

FOREIGN PATENT DOCUMENTS

WO        WO2020001821 A1        1/2020

OTHER PUBLICATIONS

European Patent Office Extended Search Report, dated Jun. 17, 2021, regarding Application No. EP21153181.9, 13 pages.

* cited by examiner

*Primary Examiner* — Mohammed Rachedine
(74) *Attorney, Agent, or Firm* — Yee & Associates, P.C.

(57) ABSTRACT

A method of localizing an object is provided. The method comprises deactivating a wireless system in a defined zone and then activating a wireless data concentrator located in the defined zone, wherein the wireless data concentrator is electrically isolated from the wireless system. The wireless system is activated, wherein the wireless system is electrically coupled to a circuit breaker with a known location in the defined zone. A signal from the wireless system is received at the wireless data concentrator. The distance of the wireless system from the wireless data concentrator is determined based on the signal, and a location is assigned to the wireless system within the defined zone based on the distance of the wireless system from the wireless data concentrator and the known location of the circuit breaker in the defined zone.

27 Claims, 12 Drawing Sheets

IDENTIFYING LOCATIONS OF ITEMS IN AIRCRAFT

BACKGROUND INFORMATION

1. Field

The present disclosure relates generally to aircraft design, more specifically, to a method for mapping and localizing seats in the aircraft via wireless access points.

2. Background

For certain items installed in an aircraft, or other defined area, the locations of those items within the aircraft must be determined. This process of determining location within a defined space is also known as localization.

Localization of systems typically relies on data wiring and switches for each seat. In-flight entertainment (IFE) systems typically require wiring to each seat, and this wiring can be used for localization of the seats. Some baseline designs for aircraft might not include in-flight entertainment (IFE). Therefore, there is no pre-existing reason to run data wiring to every seat other than for localization.

Therefore, it would be desirable to have a method and apparatus that take into account at least some of the issues discussed above, as well as other possible issues.

SUMMARY

An illustrative embodiment of the present disclosure provides method of localizing an object is provided. The method comprises deactivating a wireless system in a defined zone and then activating a wireless data concentrator located in the defined zone, wherein the wireless data concentrator is electrically isolated from the wireless system. The wireless system is activated, wherein the wireless system is electrically coupled to a circuit breaker with a known location in the defined zone. A signal from the wireless system is received at the wireless data concentrator. The distance of the wireless system from the wireless data concentrator is determined based on the signal, and a location is assigned to the wireless system within the defined zone based on the distance of the wireless system from the wireless data concentrator and the known location of the circuit breaker in the defined zone.

Another illustrative embodiment provides a system for localizing an object. The system comprises a storage device configured to store program instructions; and one or more processors operably connected to the storage device and configured to execute the program instructions to cause the system to: activate a wireless data concentrator located in a defined zone; receive, at the wireless data concentrator, a signal from a wireless system in the defined zone subsequent to activation of the wireless system, wherein the wireless system is coupled to a circuit breaker with a known location in the defined zone; determine a distance of the wireless system from the wireless data concentrator based on the signal received from the wireless system; and assign a location to the wireless system within the defined zone based on the distance of the wireless system from the wireless data concentrator and the known location of the circuit breaker in the defined zone.

Another illustrative embodiment provides a computer program product for localizing an object. The computer program product comprises a non-volatile computer readable storage medium having program instructions stored thereon to perform the steps of: activating a wireless data concentrator located in a defined zone; receiving, at the wireless data concentrator, a signal from a wireless system in the defined zone subsequent to activation of the wireless system, wherein the wireless system is coupled to a circuit breaker with a known location in the defined zone; determining a distance of the wireless system from the wireless data concentrator based on the signal received from the wireless system; and assigning a location to the wireless system within the defined zone based on the distance of the wireless system from the wireless data concentrator and the known location of the circuit breaker in the defined zone.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that certain items such as seats must be localized (mapped) within an aircraft. Localization of systems such as seats typically relies on data wiring and switches for each seat.

The illustrative embodiments recognize and take into account that past in-flight entertainment (IFE) systems typically required wiring to each seat, and this wiring could be used for localization of the seats. However, some designs for aircraft might not include in-flight entertainment (IFE). Therefore, there is no pre-existing reason to run data wiring to every seat other than for localization.

The illustrative embodiments recognize and take into account that running a data wire to each seat on a commercial aircraft adds weight to the aircraft, requires space, and may require labor of technicians. In addition, data wiring limits reconfigurability.

The illustrative embodiments provide a method for mapping aircraft seats that do not have wired IFE, for example. Wireless access points (WAP) and smart seat controllers are used to measure signal strength from nodes (seats) in a wireless IFE system, in conjunction with knowledge of the aircraft's power system, to localize (e.g., map) seat locations within the aircraft. In contrast to wiring, a wireless system that can automatically localize itself is dynamic and easier to reconfigure than wiring.

Figure 1:
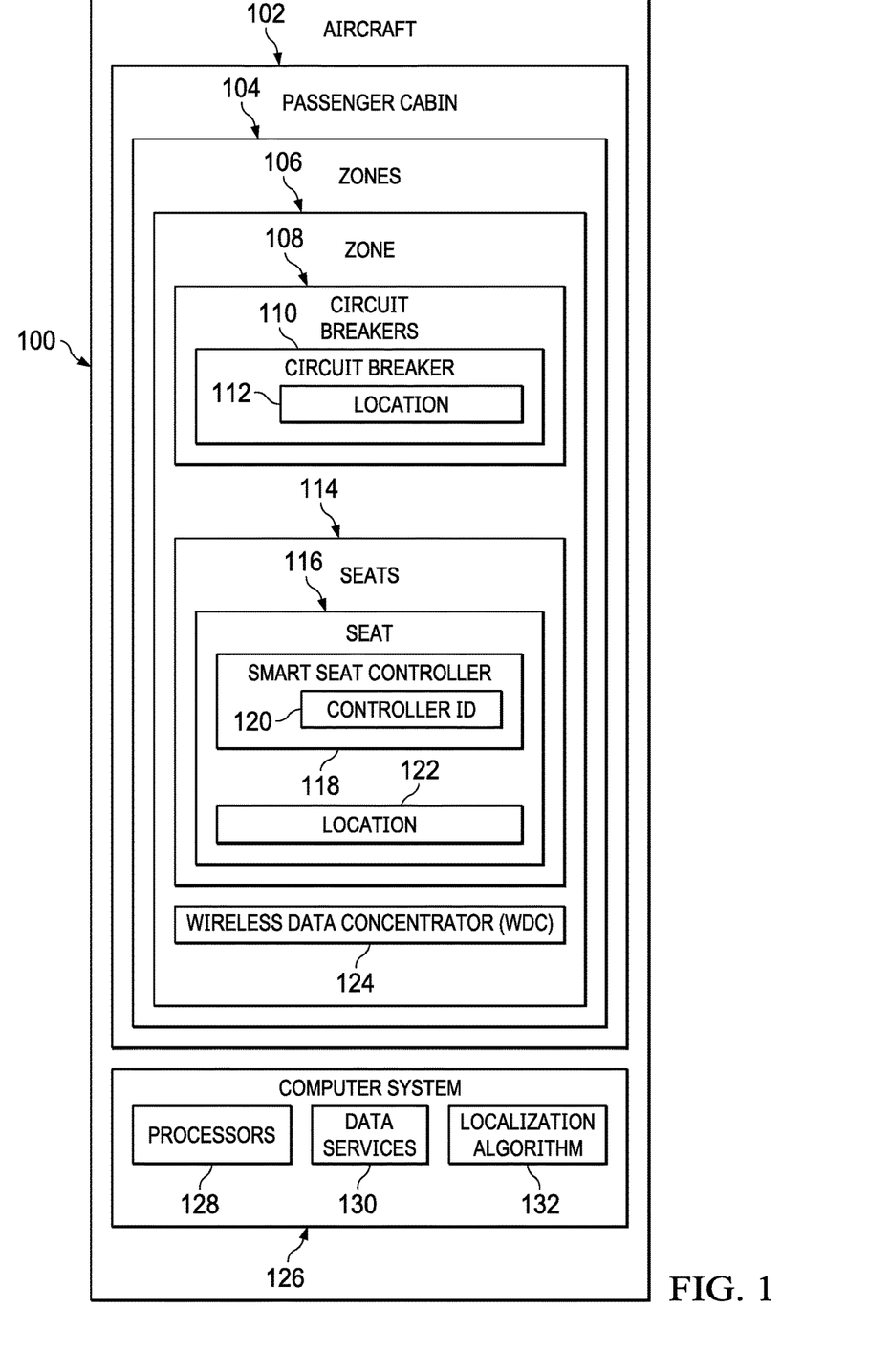
FIG. 1 is an illustration of a block diagram of an aircraft in accordance with an illustrative embodiment.

Turning now to FIG. 1, an illustration of a block diagram of an aircraft in accordance with an illustrative embodiment. Aircraft 100 comprises passenger cabin 102 that is divided into a number of defined physical zones 104. While an aircraft 100 is shown, other embodiments for are possible, such as a vehicle, bus, van, car, and the like.

Each zone 106 comprises a number of seats 114, a number of circuit breakers 108 responsible for controlling the supply of electrical power to the seats 114, and a wireless data concentrator (WDC) 124 that can serve as a wireless access point for sensor data acquisition.

Each circuit breaker 110 has a location 112 within its zone 106. For example, the circuit breaker 110 might be on the left side of the cabin 102, on the right side, or in the middle.

Each seat 116 among the number of seats 114 in each zone 106 might be equipped with a smart seat controller (SSC) 118 that is an electronic wireless system that can communicate wirelessly with WDC 124 to provide data about seat 116. Each SSC 118 has a unique identifier (ID) 120, which coincides with the location 122 of the seat 114 in question.

Furthermore, the location 122 of each seat 114 coincides with the location 112 in zone 106 controlled by a particular circuit breaker 110.

Aircraft 100 might also comprise computer system 126. Computer system 126 might comprise a number of processors 128. Processors 128 might be configured to control a number of data services 130 for aircraft 100 to execute a localization algorithm 132 for seats 114 in the passenger cabin 102.

Figure 2:
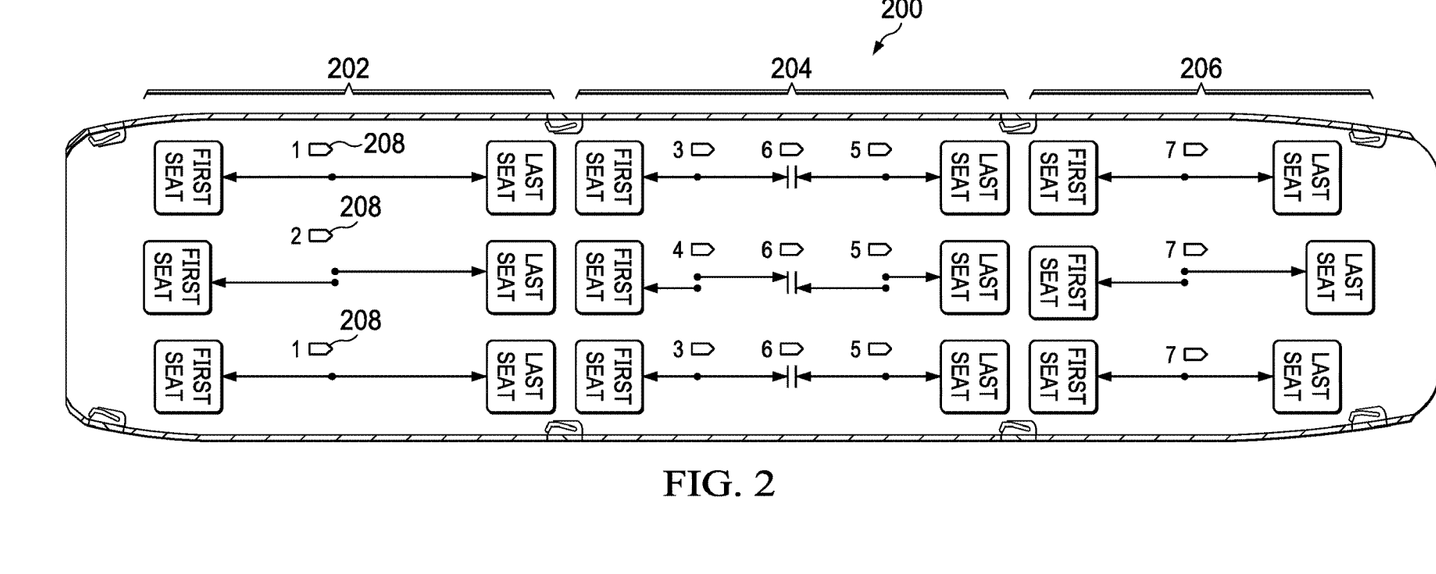
FIG. 2 illustrates passenger seat electrical power functional schematic for an aircraft in accordance with an illustrative embodiment.

FIG. 2 illustrates passenger seat electrical power functional schematic for an aircraft in accordance with an illustrative embodiment. Passenger cabin 200 might be an example of cabin 102 in FIG. 1.

In this example, cabin 200 is divided into three physical zones 202, 204, 206. Each of the zones 202, 204, 206 comprises a number of circuit breakers 208 that control the supply of electricity to respective columns of seats within each zone.

Figure 3:
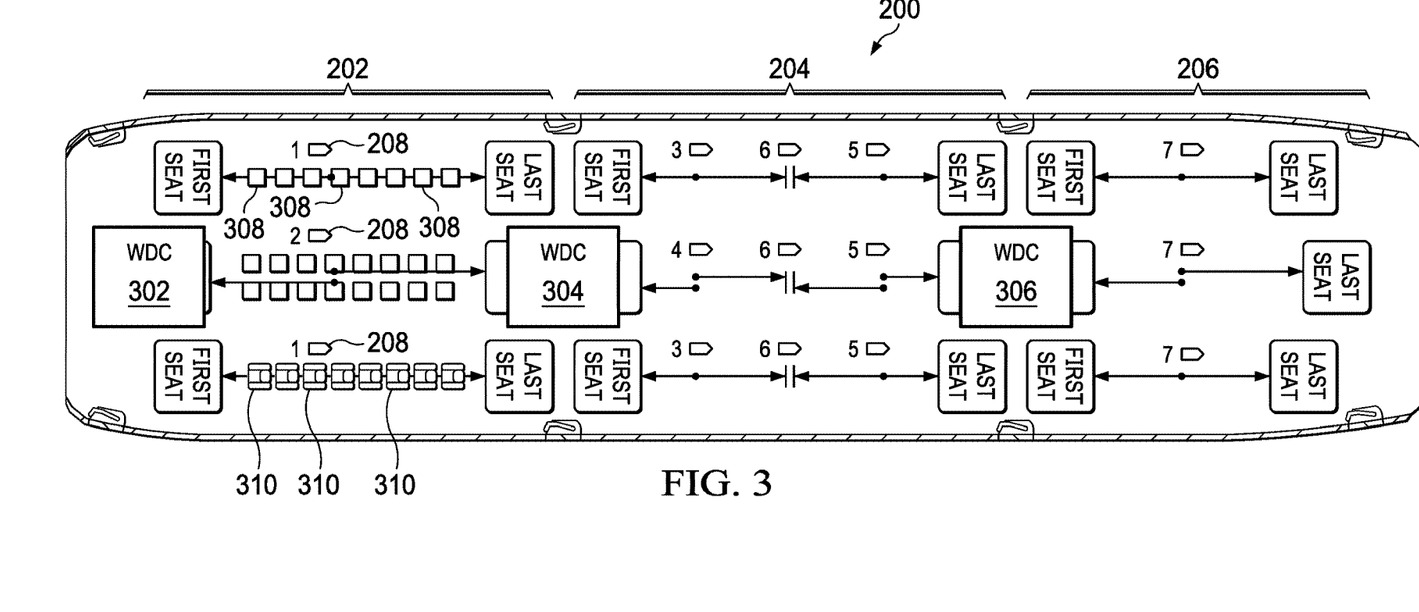
FIG. 3 illustrates a wireless communication system within an aircraft cabin in accordance with an illustrative embodiment.

FIG. 3 illustrates a wireless communication system within an aircraft cabin in accordance with an illustrative embodiment. FIG. 3 depicts the placement of wireless data concentrators (WDC) 302, 304, and 306 within respective zones 202, 204, and 206 of aircraft cabin 200.

Also shown in FIG. 3 is the placement of smart seat controllers (SSC) 308 in zone 202. Each SSC 308 corresponds with a seat 310 in zone 202. For ease of illustration, only one column of seats 310 and only SSCs 308 for zone 202 are shown in this example, but similar SSCs and seats can also be located in zones 204 and 206.

In an illustrative example, WDCs 302, 304, and 306 receive electricity from a different electrical source than the SSCs 308 in each zone and therefore are not coupled to the circuit breakers 208 that control the supply of electricity to the respective columns of seats (and SSCs) within each zone 202, 204, 206. As used herein, items that are on different electrical networks may be referred to as electrically isolated. For example, WDCs 302, 304, and 306 might be powered by an airplane data network by utilizing Power over Ethernet (PoE) wherein electric power is provided together with data over Ethernet cabling.

The illustrative embodiments take advantage of the presence of the WDCs and SSCs in each zone to perform localization of seats in the cabin 200 without the need for physical data wiring.

Figure 4:
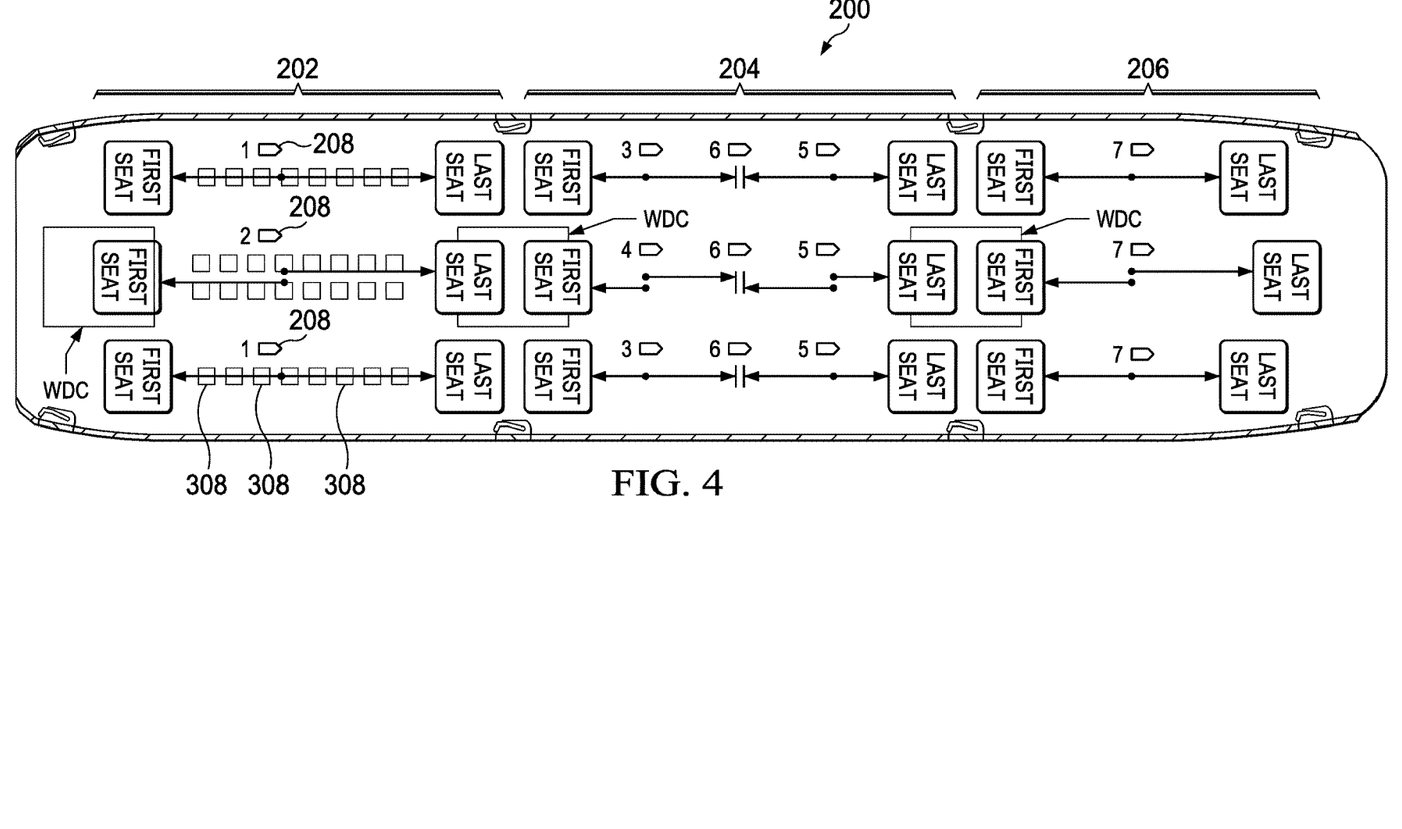
FIG. 4 illustrates an initial step in a localization procedure in an aircraft cabin in accordance with an illustrative embodiment.

FIG. 4 illustrates an initial step in a localization procedure in the aircraft cabin 200 in accordance with an illustrative embodiment. In this first step all of the circuit breakers 208 in the first zone 202 are opened, which cuts the flow of electric power to the SSCs 308 in the zone. Put more simply, everything is initially set to an off position.

Figure 5:
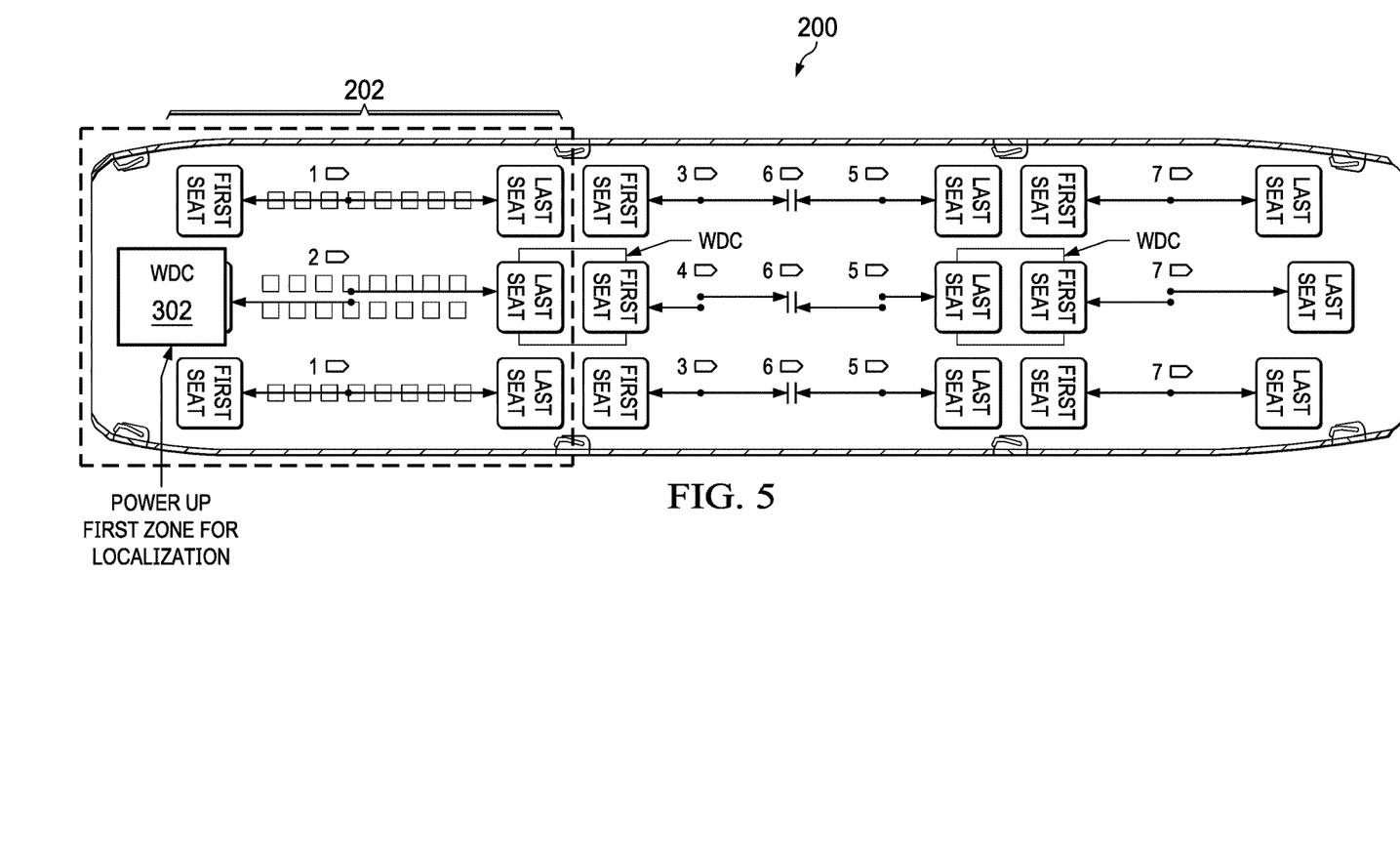
FIG. 5 illustrates a power up step for localization in accordance with an illustrative embodiment.

FIG. 5 illustrates a power up step for localization in accordance with an illustrative embodiment. In this step, WDC 302 in zone 202 is turned on and is ready to receive signals from SSCs in the seats. Because WDC 302 is powered by a separate electrical source than the SSCs 308 in zone 202, WDC 302 can be turned on prior to engaging the circuit breakers controlling power to the SSCs 308.

Figure 6:
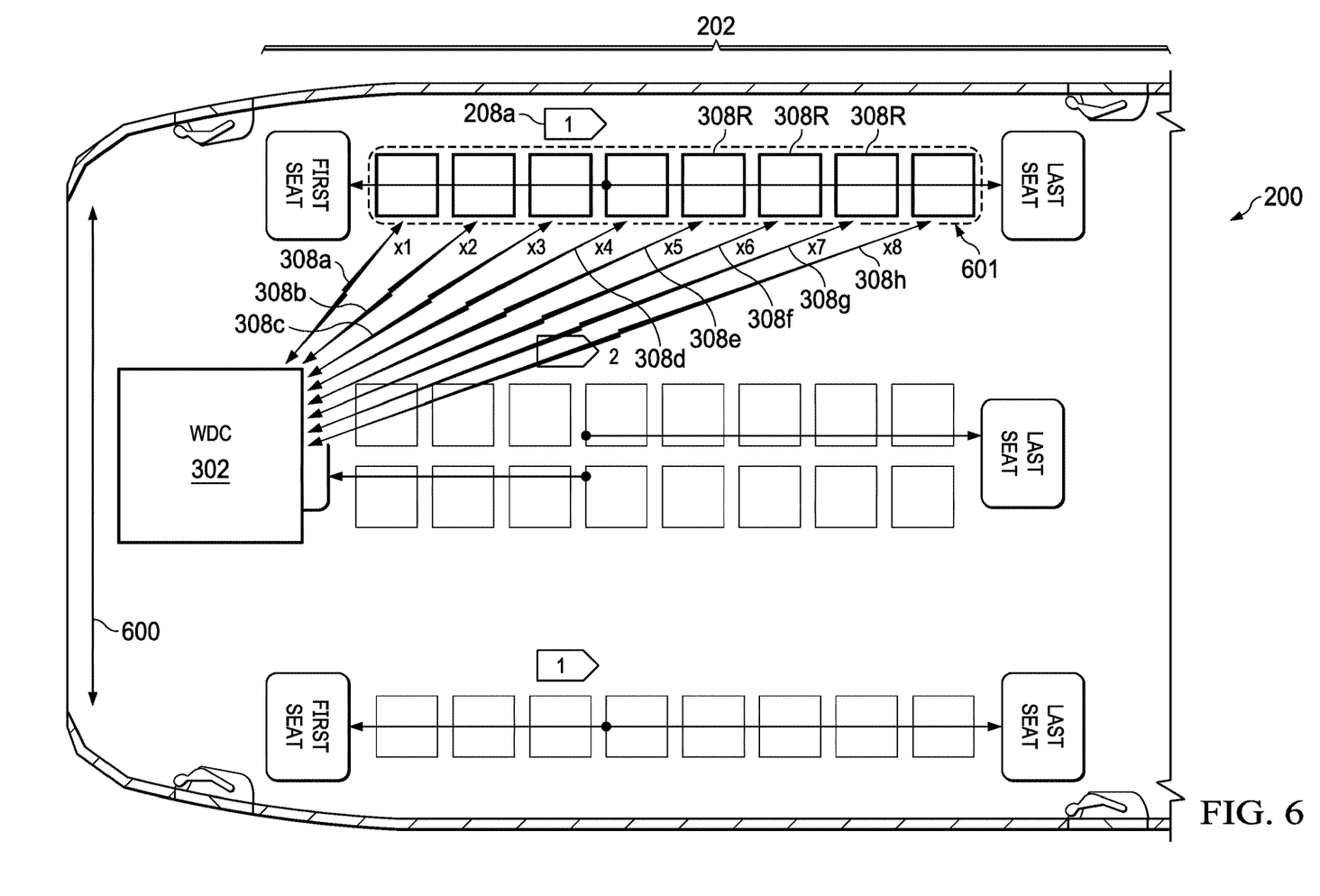
FIG. 6 illustrates localization of a group of seats in the first zone of the aircraft cabin in accordance with an illustrative embodiment.

FIG. 6 illustrates localization of a group of seats in the first zone of the aircraft cabin in accordance with an illustrative embodiment. After WDC 302 has powered up and is ready to receive signals from SSCs, one circuit breaker in zone 202 is engaged to supply power to a first group of SSCs 601. In the example shown in FIG. 6, circuit breaker 208*a* which controls the starboard side power of cabin 200, is engaged to supply power to SSCs 308R. When WDC 302 receives a signal that circuit breaker 208*a* is engaged, WDC 302 synchronizes the clocks in the active SSCs 308R.

SSCs 308R power up and transmit signals 308*a*-308*h* to WDC 302. Each signal from each SSC includes a time of transmission and a unique ID. The WDC 302 records the time of reception for each signal. As shown in FIG. 6, each successive SSC in the group of SSCs 308R is a farther distance from WDC 302 than the SSC in front of it. Consequently, the respective times of flight for the signals 308*a*-308*h* from each SSC is longer the farther the SSC in question is from WDC 302. Using the respective time of transmission and time of reception for each received signal, WDC 302 determines a distance for each SSC ID that appears after the circuit breaker 208*a* is engaged. This assumes that x1<x2< . . . <x8 in time units.

Radio signal strength (RSS) also decreases with distance, which can be measured by WDC 302. Therefore, WDC 302 can also determine a distance for each SSC ID based on the strength of the signal. Signal strength can be used instead of, or in conjunction with, signal time of flight to define the distance of each SSC 308R from WDC 302.

To reduce the complexity of the position calculations, the directionality of signals can be ignored by placing the WDC 302 at the front end of zone 202, forward of all the SSCs 308 in zone 202 of the cabin 200, as shown in FIG. 6. Alternatively, WDC 302 might be located aft of all SSCs 308 at the rear of zone 202. Positioning of the WDC 302 at either end of zone 202 removes the need to account for the directionality of the radio signals because the SSCs 308 are collinear with each other and perpendicular to the aircraft station line of zone 202, while being within the same 180° field of view of the WDC 302. A station line is a plane that is perpendicular to the longitudinal center line of the aircraft and is represented by line 600. Therefore, the position calculations need only account for time of flight and signal strength.

Figure 7:
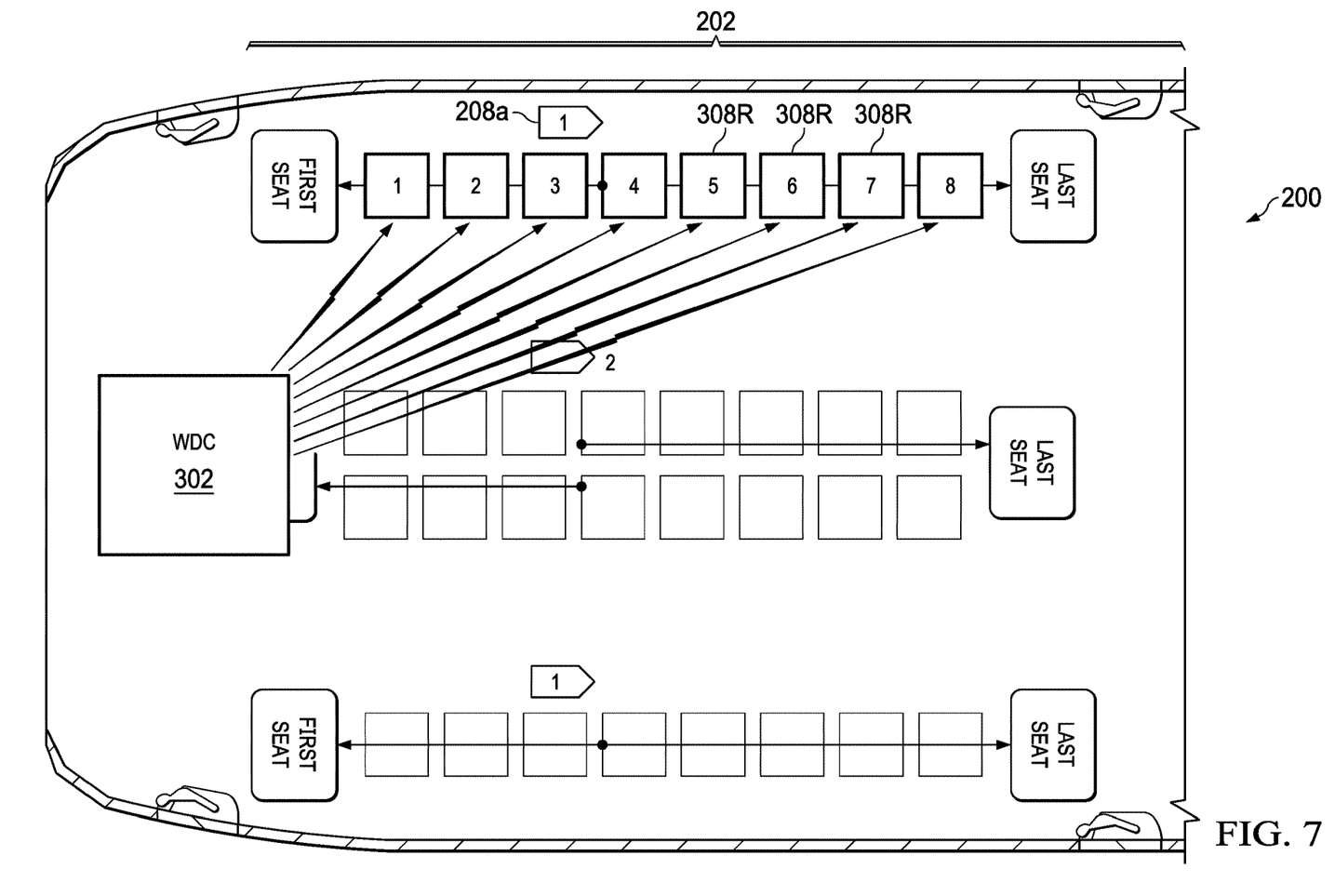
FIG. 7 illustrates assignment of seat locations after determining distances in accordance with an illustrative embodiment.

FIG. 7 illustrates assignment of seat locations after determining distances in accordance with an illustrative embodiment. As shown in FIG. 7, each SSC 308R is assigned a respective location 1-8 that is derived from the distance of each SSC from WDC 302 and the known location of circuit breaker 208a that was engaged.

Because each of SSCs 308R is installed in a separate seat, the locations 1-8 are also the de facto locations of the respective, corresponding seats (e.g., seats 310).

Figure 8:
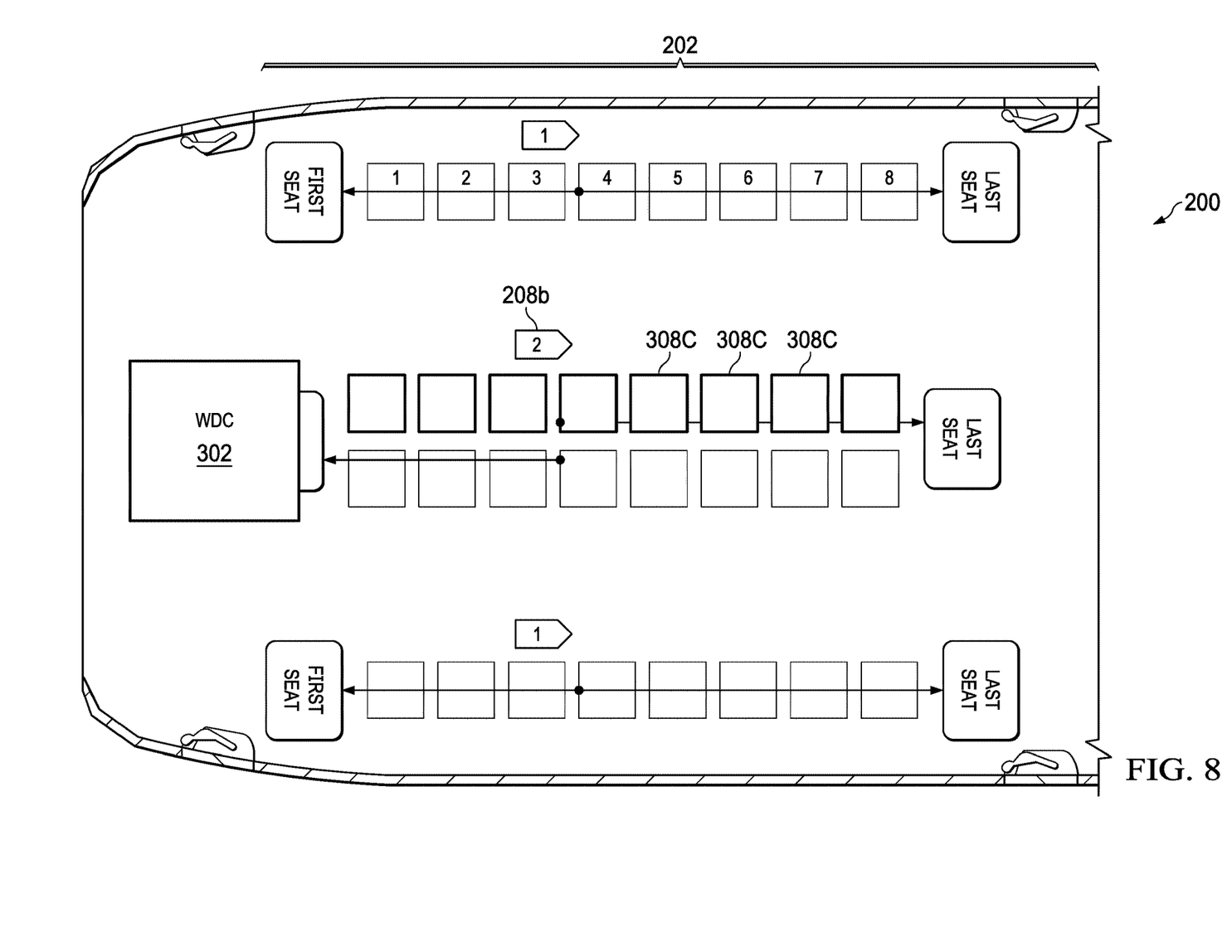
FIG. 8 illustrates localization for a next group of seats in the cabin zone in accordance with an illustrative embodiment.

FIG. 8 illustrates localization for a next group of seats in cabin zone 202 in accordance with an illustrative embodiment. After locations 1-8 are assigned to the first group of SSCs 308R in zone 202, circuit breaker 208a is opened to cut power to SSCs 308R, and another circuit breaker in zone 202 is engaged.

In the example shown in FIG. 8, circuit breaker 208b is engaged, which supplies power to activate SSCs 308C. The procedure shown in FIGS. 6 and 7 is applied for this next group of SSCs.

Figure 9:
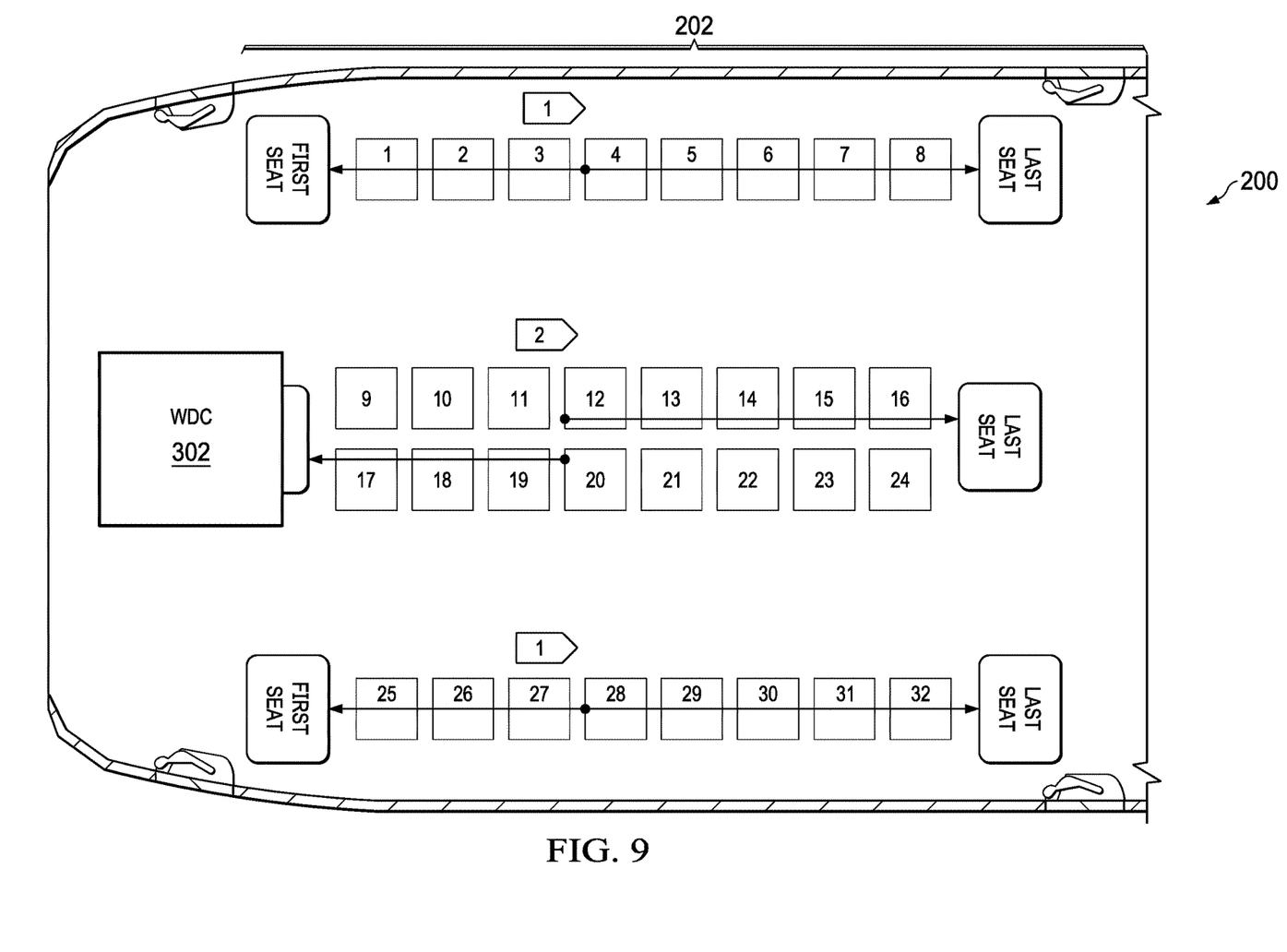
FIG. 9 illustrates a cabin zone with locations assigned to all seats in accordance with an illustrative embodiment.

The localization process is performed iteratively for each circuit breaker and corresponding SSCs until all SSCs/seats in zone 202 have been assigned locations, as shown in FIG. 9.

Afterward zone 202 is complete, the same localization procedure can be applied to zones 204 and 206.

Figure 10:
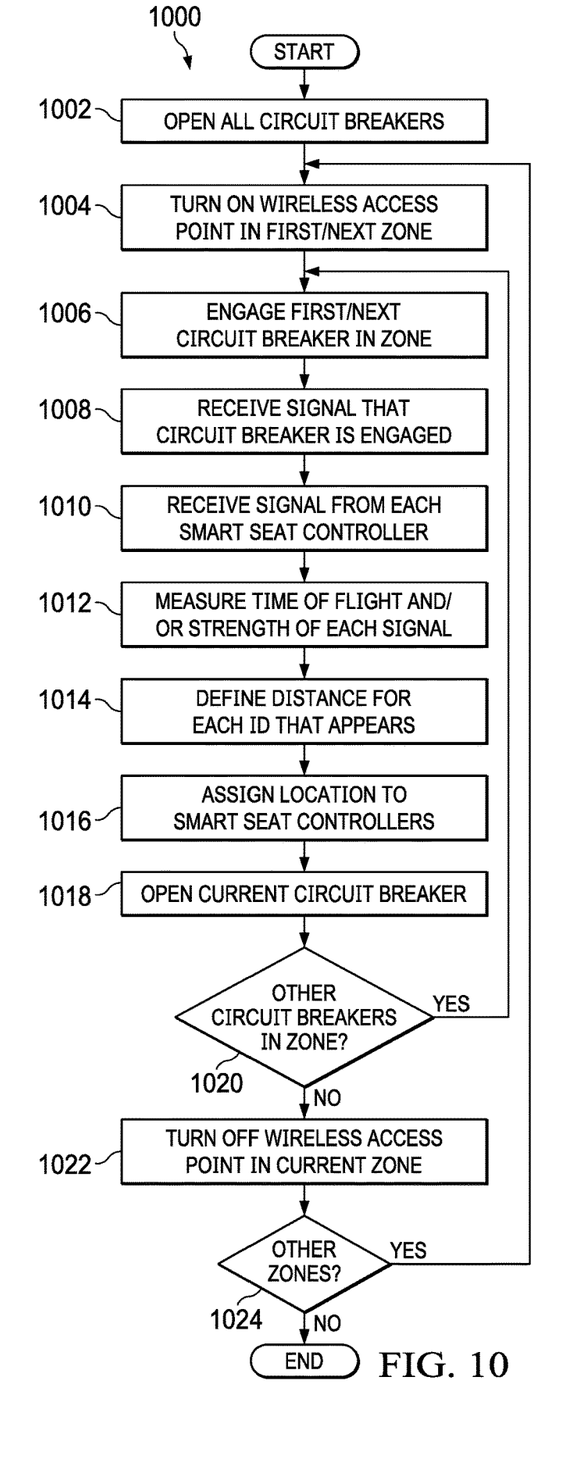
FIG. 10 illustrates a flowchart of a process for localization of seats in an aircraft in accordance with an illustrative embodiment.

FIG. 10 illustrates a flowchart of a process for localization of seats in an aircraft in accordance with an illustrative embodiment. Process 1000 is an example of a localization procedure as shown in FIGS. 4-9 and can be applied to an aircraft such as aircraft 100 in FIG. 1.

Process 1000 begins by opening all circuit breakers for the cabin of an aircraft (step 1002) and then turning on a wireless data point in a first defined zone in the aircraft cabin (step 1004).

After the wireless data point powers up, a first circuit breaker in the selected cabin zone is engaged, which supplies power to smart seat controllers (SSC) electrically coupled to the circuit breaker (step 1006). The wireless data point receives a signal that the first circuit breaker has been engaged, which synchronizes all clocks for systems receiving power (step 1008).

The wireless data point then receives a signal from each active SSC, which includes a unique ID for that SSC (step 1010). The wireless data point measures a time of flight and/or radio signal strength of each signal received from each SSC (step 1012).

Based on the respective time of flight and/or signal strength of each SSC signal, the wireless data point determines a distance for each SSC ID (step 1014) and assigns a location in the cabin to each SSC/seat based on the defined distance (step 1016).

After all SSC/seats coupled to the first circuit breaker have an assigned location, process 1000 opens the current circuit breaker (thereby cutting power to the first group of SSCs) (step 1018) and determines if there are other circuit breakers in the first selected cabin zone that have not yet been engaged (step 1020).

If there are more circuit breakers in the zone, process 1000 returns to step 1006 and engages the next circuit breaker.

After all circuit breakers in the defined zone have been engaged and locations assigned to all SSC/seats in the defined zone, process 1000 turns off power to the wireless data point in the current defined zone (step 1022) and determines if there are other zones in the aircraft cabin that require localization (step 1024).

If there are other cabin zones that require localization, process 1000 returns to step 1004 and turns on the wireless data point in the next zone in the cabin. If there are no remaining zones that require localization, process 1000 ends.

Figure 11:
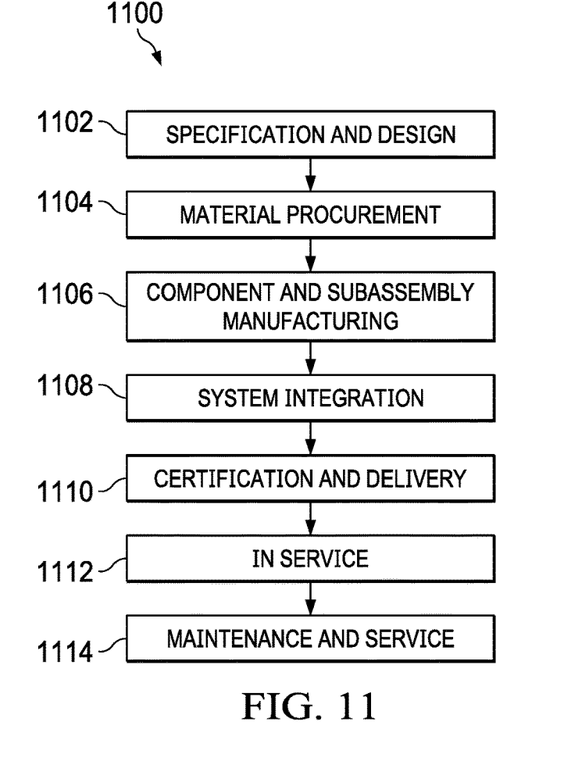
FIG. 11 is an illustration of an aircraft manufacturing and service method in a form of a block diagram in accordance with an illustrative embodiment.
Figure 12:
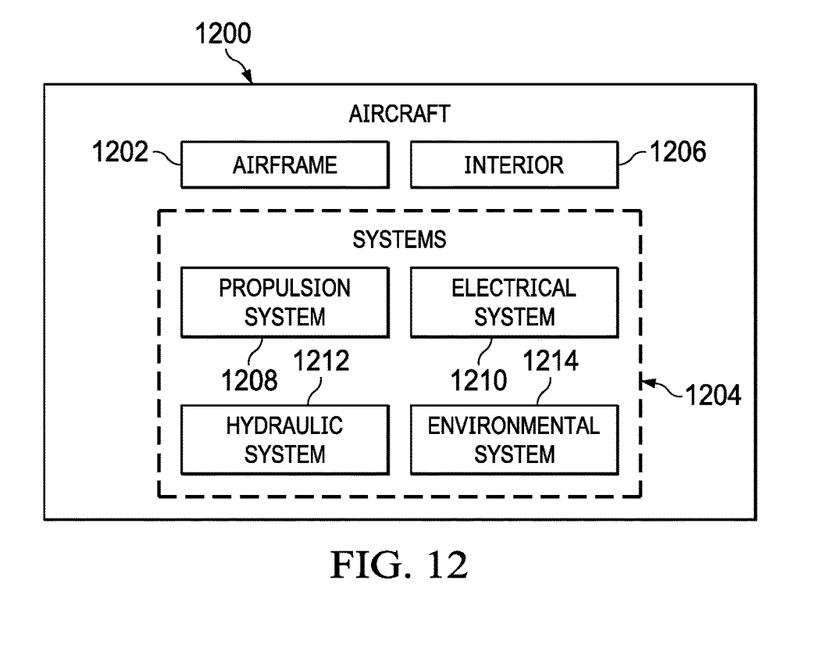
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

Figure 13:
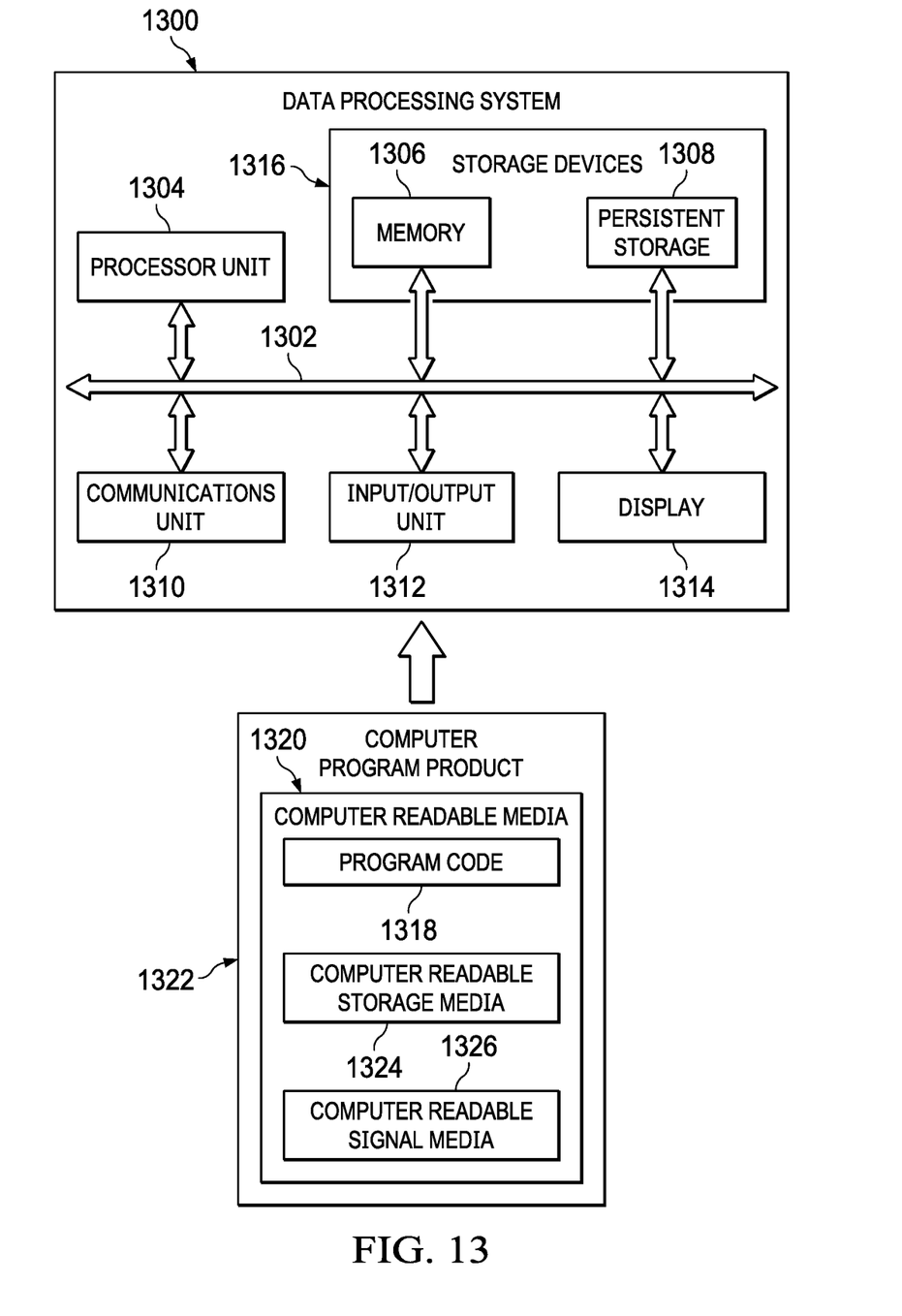
FIG. 13 depicts a block diagram of a data processing system in accordance with an illustrative embodiment.

Turning now to FIG. 13, an illustration of a block diagram of a data processing system is depicted in accordance with an illustrative embodiment. Data processing system 1300 might be an example of computer system 126 in FIG. 1. Data processing system 1300 might also be a component of wireless data concentrator 124 in FIG. 1. Data processing system 1300 might be used to implement one or more computers to carry out the process steps shown in FIGS. 4-10. In this illustrative example, data processing system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation. In an embodiment, processor unit 1304 comprises one or more conventional general purpose central processing units (CPUs). In an alternate embodiment, processor unit 1304 comprises a number of graphical processing units (CPUs).

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308. Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer-usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In one example, computer-readable media 1320 may be computer-readable storage media 1324 or computer-readable signal media 1326.

In these illustrative examples, computer-readable storage media 1324 is a physical or tangible storage device used to store program code 1318 rather than a medium that propagates or transmits program code 1318. Alternatively, program code 1318 may be transferred to data processing system 1300 using computer-readable signal media 1326.

Computer-readable signal media 1326 may be, for example, a propagated data signal containing program code 1318. For example, computer-readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of localizing an object, the method comprising:
   deactivating a wireless system in a defined zone;
   activating a wireless data concentrator located in the defined zone, wherein the wireless data concentrator is electrically isolated from the wireless system;
   activating the wireless system, wherein the wireless system is electrically coupled to a circuit breaker with a known location in the defined zone;
   determining a distance of the wireless system from the wireless data concentrator based on a signal received by the wireless data concentrator from the wireless system; and
   assigning a location to the wireless system within the defined zone based on the distance of the wireless system from the wireless data concentrator and the known location of the circuit breaker in the defined zone.

2. The method of claim 1, wherein the wireless system comprises a smart seat controller.

3. The method of claim 1, wherein respective clocks in the wireless system and wireless data concentrator synchronize when the wireless system is activated.

4. The method of claim 1, wherein the distance of the wireless system from the wireless data concentrator is determined according to a time of flight of the signal received from the wireless system.

5. The method of claim 4, wherein time of flight is calculated from a time of transmission included in the signal and a time of reception recorded by the wireless data concentrator.

6. The method of claim 1, wherein the distance of the wireless system from the wireless data concentrator is determined according to a radio signal strength of the signal received from the wireless system.

7. The method of claim 1, wherein:
   deactivating the wireless system comprises opening the circuit breaker, and activating the wireless system comprises closing the circuit breaker.

8. The method of claim 1, wherein the wireless data concentrator is not electrically coupled to the circuit breaker.

9. The method of claim 1, wherein the object is a seat on an aircraft.

10. A system for localizing an object, the system comprising:
    a storage device configured to store program instructions; and
    one or more processors operably connected to the storage device and configured to execute the program instructions to cause the system to:
       activate a wireless data concentrator located in a defined zone;
       receive, at the wireless data concentrator, a signal from a wireless system in the defined zone subsequent to activation of the wireless system, wherein the wireless system is coupled to a circuit breaker with a known location in the defined zone;
       determine a distance of the wireless system from the wireless data concentrator based on the signal received from the wireless system; and
       assign a location to the wireless system within the defined zone based on the distance of the wireless system from the wireless data concentrator and the known location of the circuit breaker in the defined zone.

11. The system of claim 10, wherein the wireless system comprises a smart seat controller.

12. The system of claim 10, wherein respective clocks in the wireless system and wireless data concentrator synchronize when the wireless system is activated.

13. The system of claim 10, wherein the distance of the wireless system from the wireless data concentrator is determined according to a time of flight of the signal received from the wireless system.

14. The system of claim 13, wherein time of flight is calculated from a time of transmission included in the signal and a time of reception recorded by the wireless data concentrator.

15. The system of claim 10, wherein the distance of the wireless system from the wireless data concentrator is determined according to a radio signal strength of the signal received from the wireless system.

16. The system of claim 10, wherein activating the wireless system comprises closing the circuit breaker.

17. The system of claim 10, wherein the wireless data concentrator is not electrically coupled to the circuit breaker.

18. The system of claim 10, wherein the object is a seat on an aircraft.

19. A non-transitory computer readable medium for localizing an object, the non-transitory computer readable medium comprising:
    a non-volatile computer readable storage medium having program instructions stored thereon to perform the steps of:
       activating a wireless data concentrator located in a defined zone;
       receiving, at the wireless data concentrator, a signal from a wireless system in the defined zone subsequent to activation of the wireless system, wherein the wireless system is coupled to a circuit breaker with a known location in the defined zone;
       determining a distance of the wireless system from the wireless data concentrator based on the signal received from the wireless system; and
       assigning a location to the wireless system within the defined zone based on the distance of the wireless system from the wireless data concentrator and the known location of the circuit breaker in the defined zone.

20. The non-transitory computer readable medium of claim 19, wherein the wireless system comprises a smart seat controller.

21. The non-transitory computer readable medium of claim 19, wherein respective clocks in the wireless system and wireless data concentrator synchronize when the wireless system is activated.

22. The non-transitory computer readable medium of claim 19, wherein the distance of the wireless system from the wireless data concentrator is determined according to a time of flight of the signal received from the wireless system.

23. The non-transitory computer readable medium of claim 22, wherein time of flight is calculated from a time of transmission included in the signal and a time of reception recorded by the wireless data concentrator.

24. The non-transitory computer readable medium of claim 19, wherein the distance of the wireless system from the wireless data concentrator is determined according to a radio signal strength of the signal received from the wireless system.

25. The non-transitory computer readable medium of claim 19, wherein activating the wireless system comprises closing the circuit breaker.

26. The non-transitory computer readable medium of claim 19, wherein the wireless data concentrator is not electrically coupled to the circuit breaker.

27. The non-transitory computer readable medium of claim 19, wherein the object is a seat on an aircraft.

* * * * *